Aug. 16, 1927.
A. N. CRAMER
1,638,920
APPARATUS FOR TRANSFERRING GLASS ARTICLES
Filed April 3, 1924    2 Sheets-Sheet 1
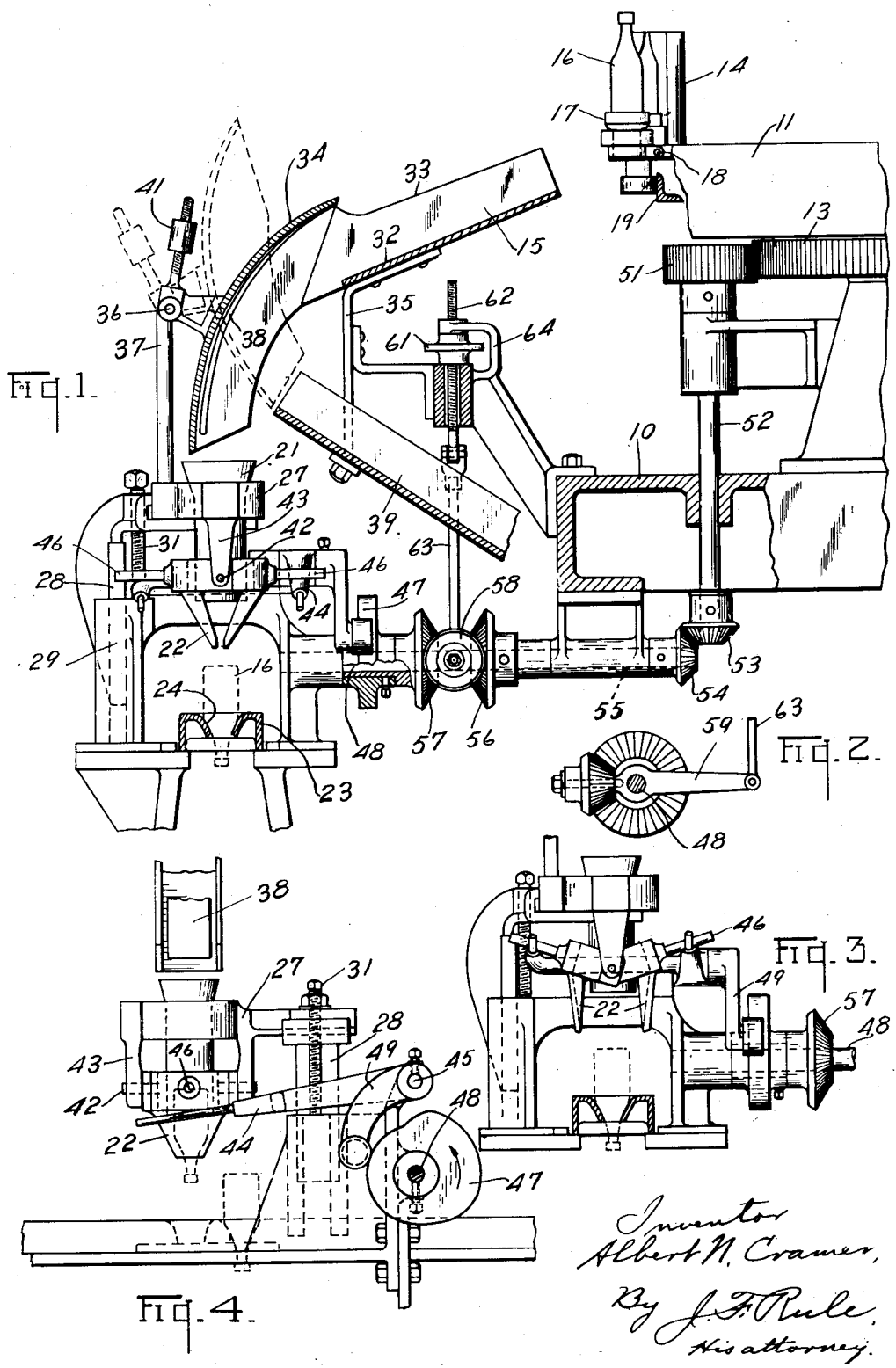

Aug. 16, 1927.
A. N. CRAMER
1,638,920
APPARATUS FOR TRANSFERRING GLASS ARTICLES
Filed April 3, 1924    2 Sheets-Sheet 2
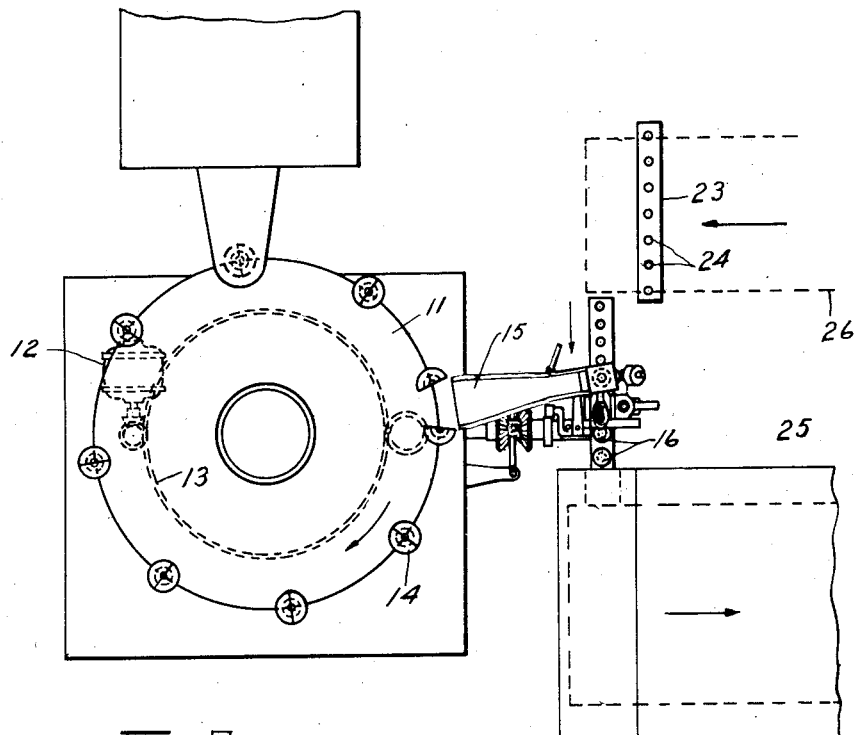
Fig.5.
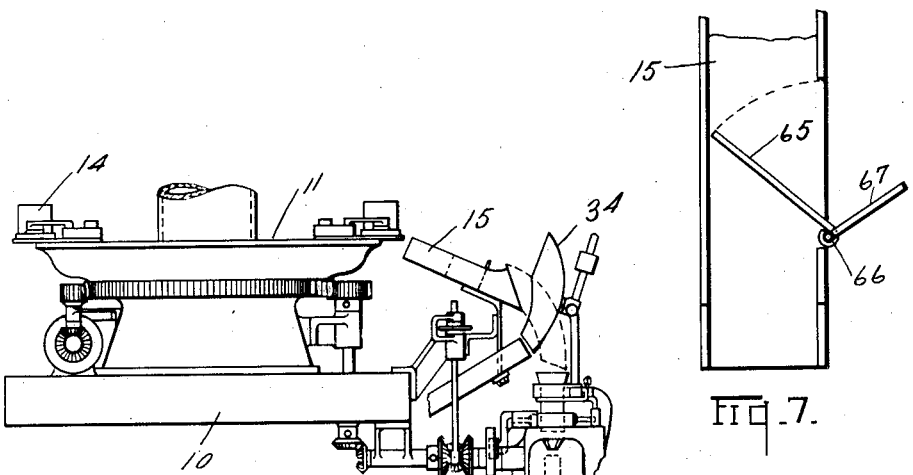
Fig.6.
Fig.7.
Inventor
Albert N. Cramer
By J.F. Rule,
His attorney.

Patented Aug. 16, 1927.

1,638,920

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

APPARATUS FOR TRANSFERRING GLASS ARTICLES.

Application filed April 3, 1924. Serial No. 704,002.

My invention relates to apparatus for receiving bottles or other glass articles as they are discharged from a forming machine and delivering them to leer pans or other means for the transfer of the articles to the leer.

In its preferred form, the invention comprises a chute to receive the bottles or other articles from the machine, a pair of clappers or holder to receive the articles from the chute and temporarily hold them, and automatic means for actuating the holder to release the articles and drop them to a leer pan or other support.

An object of the invention is to provide improved means associated with the chute for temporarily directing or carrying the articles away from the said holder.

A further feature of the invention relates to an improved construction of the chute by which danger of the same becoming clogged by the glass wave or cullet is reduced or eliminated.

A further feature of the invention consists in providing mechanism whereby the articles as delivered from the forming machine may be transferred to leer pans or the like located at a greater distance from said machine than has heretofore been found practicable. The machine can thus be located at a greater distance from the leer, resulting in better atmospheric conditions for the operator and other advantages.

Other features of the invention will appear hereinafter.

In the accompanying drawings:

Figure 1 is a part sectional side elevation of apparatus embodying the principles of my invention.

Figure 2 is a detail of a differential adjustment for timing the operation of the clappers.

Figure 3 is a side elevation of the clapper mechanism, showing the clappers open to release the bottle.

Figure 4 is a rear elevation of the same, with the clappers in closed position.

Figure 5 is a diagrammatic plan view showing the arrangement of the bottle blowing machine, leer, and transfer mechanism.

Figure 6 is an elevation of the same, but with the leer omitted.

Figure 7 is a detail showing a switch from the transfer chute.

The transfer mechanism is herein shown in connection with a standard Owens equipment comprising an Owens bottle blowing machine, leer and leer pans which are automatically brought to position to receive the bottles as they are delivered from the machine. The bottle blowing machine comprises a base 10 on which is mounted a mold carriage 11. The carriage is rotated by a motor 12 (Fig. 5) having a driving connection with the carriage through a train of gears including an annular gear 13 on the carriage. Finishing molds 14 on the carriage are successively brought to a discharging position opposite a chute 15.

As a mold approaches discharging position, it is automatically opened leaving the bottle 16, or other article, supported on a mold bottom 17 having a hinge connection 18 with the carriage. A cam track 19 permits the mold bottom to tilt and drop the bottle onto the chute. The bottle is carried by gravity, neck end first, down the chute into and through a funnel guide 21 to a pair of clappers or holding arms 22 by which the bottle is temporarily supported. The clappers are then opened (as hereinafter described), and the bottle dropped therefrom into a leer pan 23.

The leer pans as shown are of the Owens type, each pan comprising a row of cups or openings 24. The pan is moved lengthwise step by step beneath the clappers to receive the bottles. This step movement of the pan advances it into position to be conveyed through the annealing leer 25 in the usual manner. It is then automatically returned along the path 26 and into position to receive another charge of bottles. The funnel guide 21 and clapper mechanism are mounted on a frame 27, comprising a vertical depending arm 28 having a sliding connection with a stationary frame 29 to permit vertical adjustment of the frame 27. Such adjustment is effected by means of a screw rod 31.

The chute 15 comprises an upper section having a bottom 32 and sides 33, and a lower section 34. The upper section is mounted on a stationary bracket 35. The lower section has a hinge connection 36 with a post 37 arising from the frame 27. The inner or under side of the chute 34 is entirely open; that is, the usual floor is omitted. In other words, it is an open, inverted trough. The momentum of the bottles as they slide down the floor 32 is sufficient to throw them against the curved wall of the section 34, so that the upper surfaces of the bottles are in contact with said wall as they move downward to the funnel. The section 34 is preferably lined with a spring sheet metal strip 38 against which the bottle strikes, and along which it is guided in its downward movement. This strip absorbs the shock of the bottle striking the chute, thus protecting both the chute and the bottle. The wear is also taken up by this strip which can be readily removed and replaced by a new strip. The hinge connection 36 permits the chute 34 to be swung from normal position to the broken line position, Figure 1, in which it serves to deflect the bottles or other material onto a cullet chute 39. An adjustable counterweight 41 holds the swinging chute in either position. It will be seen that with this construction the operator can instantly shift the chute to deflect the ware to the cullet chute if the machine is delivering defective ware, or if the clapper mechanism has become clogged, or if for any other reason, it is desirable to temporarily divert the glass from its regular course. This shifting of the chute also moves it away from the funnel guide 21, permitting ready access to the latter for clearing it in the event it has become clogged or for making repairs or changes. The open shape of the floorless chute 34 greatly reduces the liability of clogging. Moreover, deformed bottles or cullet passing down the chute will ordinarily drop from the floor 32 onto the cullet chute 39, and thus be diverted away from the funnel 21 even when the swinging section 34 is in its normal position.

In this connection, it is found in practice that the cullet or the deformed articles which are not as smooth or regular in shape as the perfectly formed bottles, move down the chute more slowly, and often fall directly into the cullet chute 39 without jumping the gap between the chute 15 and the deflector 34. In this connection, it is to be further noted that a normally shaped bottle sliding neck-end first down the chute, has its forward or neck-end carried beyond the floor 32 of the chute before gravity can operate to pull it downward out of the straight inclined path determined by the inclination of the chute 15. Consequently, the bottle as a whole is carried or jumps a greater distance beyond the chute than a deformed or shapeless mass of glass. The perfectly formed bottle is, therefore, directed into the funnel 21, as hereinbefore explained, while the cullet will generally fall short of the funnel and drop directly into the cullet chute.

The clapper mechanism which may be of usual construction and operation, comprises the clappers 22 having a pivotal connection 42 with depending arms 43 on the frame 27.

Rock arms 44 are secured to a rock shaft 45 and project forward therefrom to a position beneath fingers 46 extending outwardly from the clapper arms. A cam 47 keyed to a shaft 48, actuates a rock arm 49 fixed to the shaft 45, so that as the cam rotates, the arms 44 are periodically lifted to engage the fingers 46 and separate the clappers thereby permitting the bottle, which has been temporarily held by the clappers, to drop into the leer pan. The cam shaft 48 is rotated continuously, being driven from the mold carriage 11 through a gear train comprising a pinion 51 running in mesh with the gear 13, said pinion mounted on a shaft 52 carrying a gear 53 in mesh with a gear 54 on a horizontal shaft 55 in line with the cam shaft 48.

A driving connection between the shafts 55 and 48 is effected through a differential adjusting means comprising gears 56 and 57 connected respectively to said shafts and an intermediate pinion 58. Said pinion is carried on a lever arm 59, fulcrumed on the shaft 48. The arm 59 is adjustable about its fulcrum by means of a hand wheel 61 threaded on a screw rod 62 connected through a link 63 to the arm 59. The hand wheel 61 is held against vertical movement by a bearing bracket 64 so that rotation of the hand wheel will move the rod 62 up or down, thereby rotating the lever 59 about its axis and causing a relative rotation of the gears 56 and 57. This adjustment permits the operations of the clappers to be timed with relation to the step by step movements of the leer pans, it being understood that the step movements of the leer pans are controlled from the blowing machine so that the pan is advanced one step for each article discharged from the blowing machine.

The trough 15 may be provided with a gate 65 normally forming part of the side wall of the chute. The gate is hinged at 66 and provided with a handle 67 by which it may be swung to the Figure 7 position for directing articles to the cullet pile, or away from the clapper mechanism.

Modifications may be resorted to within the spirit and scope of my invention.

What I claim is:

1. The combination of a chute having a downwardly inclined floor down which articles slide by gravity, a deflector located beyond the lower end of said floor and normally positioned to engage the upper surfaces of the articles and deflects them toward a vertical direction of downward movement, and means to shift the deflector and deflect the said articles away from said vertical direction.

2. The combination of a chute having a downwardly inclined floor down which articles slide by gravity, a deflector located beyond the lower end of said floor and positioned to engage the upper surfaces of the articles and deflect them toward a vertical direction of downward movement, said deflector having its upper portion substantially parallel with said floor and its lower portion substantially vertical, means to swing said deflector to an oblique position, and a second chute disposed beneath the aforesaid chute and inclined in a reverse direction thereto and in register with the deflector when the latter is in said oblique position.

3. The combination of an inclined chute down which articles are impelled by gravity, and an open inverted trough forming a deflector located beyond the lower end of said chute and positioned to deflect and guide the articles after they leave the chute.

4. The combination of an inclined chute down which articles move by gravity, a deflector located beyond the lower end of the chute and positioned to engage the upper surfaces of the articles and direct them toward a vertical direction of downward movement, said deflector being mounted to be shifted to a position in which it forms a bottom support to receive the articles as they fall from the said chute.

5. The combination of an inclined chute down which articles move by gravity, a deflector located beyond the lower end of the chute and positioned to engage the upper surfaces of the articles and direct them toward a vertical direction of downward movement, said deflector being mounted to be shifted to a position in which it forms a bottom support to receive the articles as they fall from the said chute, the deflector in said last mentioned position forming an auxiliary inclined chute.

6. The combination of an inclined chute, an arc shaped deflector plate located below and beyond the floor of the chute and positioned to engage the upper surfaces of articles delivered from the chute, said plate being pivotally mounted to swing out of said position.

7. The combination of an inclined chute, an arc shaped deflector plate located below and beyond the floor of the chute and positioned to engage the upper surfaces of articles delivered from the chute, said plate being pivotally mounted to swing out of said position into a position to form an inclined bottom supported to receive the articles from the first mentioned chute and from which the articles are discharged by gravity, and an auxiliary chute to receive the articles delivered from the deflector plate when in said last mentioned position.

8. The combination of a chute having a downwardly inclined floor, an auxiliary chute located below and spaced from said floor, said auxiliary chute being downwardly inclined in the opposite direction with its upper end extending upwardly and outwardly beyond the lower end of said floor, and a deflector plate located beyond the lower end of said floor in a position to engage the upper surfaces of articles of predetermined shape as they slide off said floor.

9. The combination of a machine for forming and discharging glass articles, a downwardly and outwardly inclined chute positioned to receive the articles as they are delivered from the machine, a downwardly and inwardly inclined auxiliary chute located below the first mentioned chute and having its upper end projecting outwardly beyond the first chute, means pivotally mounted between the lower end of the first chute and the upper end of the second chute to cause a curved channelway between the said chutes, and means to normally keep the last mentioned means disjoined from the second chute.

10. The combination of a machine for discharging glass articles seriatim, an inclined chute onto which the articles are discharged and down which they move by gravity, a receiving device beyond and below the lower end of the chute, a curved deflector plate pivotally mounted and normally held in position to direct the articles toward said receiving means after they have left the chute, and means to shift said deflector plate away from said receiving means.

11. The combination of a machine for discharging glass articles seriatim, an inclined chute onto which the articles are discharged and down which they move by gravity, a receiving device beyond and below the lower end of the chute, a curved deflector plate pivotally mounted and normally held in position to direct the articles toward said receiving means after they have left the chute, said deflector comprising a resilient buffer plate in the path of the articles, and means to swing the deflector temporarily away from said receiving means.

12. The combination of a machine for discharging glass articles seriatim, an inclined chute onto which the articles are discharged and down which they move by gravity, a receiving device beyond and below the lower end of the chute and a curved deflector plate in position to direct the articles toward said receiving means after they have left the chute, a cullet chute, and means to shift said deflector into position to direct articles or material passing down the first chute into the cullet chute.

13. The combination of means providing a downwardly inclined guiding surface, down which articles slide by gravity, a deflector plate located beyond the lower end of said surface and positioned to engage the upper surfaces of the articles as they are carried by momentum beyond said guiding surface, said deflector shaped and arranged to deflect the articles toward a vertical direction of downward movement after leaving said guiding surface and forming the sole means of support for the articles during said downward movement, a second inclined chute disposed beneath the aforesaid chute and inclined in an opposite direction to it, and means associated with the said deflector for positioning the said chute to cause a deviation of the said articles onto the second chute.

14. The combination of a glass forming machine operable to periodically discharge formed articles, an inclined chute, means to receive said articles located below said chute, an intermediate deflector positioned to engage the upper surfaces of the articles and direct them toward said receiving means, said articles being held in contact with the deflector by their momentum, a second chute disposed beneath the aforesaid chute and reversely inclined thereto, and means operable to tilt said deflector for directing articles upon the second chute.

Signed at Toledo, in the county of Lucas and State of Ohio, this 29th day of March, 1924.

ALBERT N. CRAMER.